3,033,870
CERTAIN DERIVATIVES OF 4-(AMINOPHENYL-MERCAPTO)-PYRIDINE
Jean Druey and Konrad Meier, Riehen, Switzerland, assignors to Ciba Pharmaceutical Products Inc., Summit, N.J.
No Drawing. Filed Feb. 5, 1959, Ser. No. 791,271
Claims priority, application Switzerland Mar. 24, 1958
6 Claims. (Cl. 260—294.8)

This invention provides aminophenylmercapto-pyridines of the formula

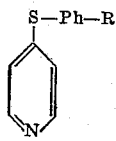

in which Ph represents a phenylene residue, and R represents a free or substituted amino group, and also salts of these compounds, and process for the manufacture thereof.

In the above compounds the phenylene residue, which preferably contains the amino group in para-position to the mercapto group, may contain further substituents, for example, halogen atoms such as chlorine or bromine, or lower alkyl or alkoxy groups, particularly methyl or methoxy or amino groups. Substituted amino groups are alkylated or acylated amino groups more especially amino-lower-alkylamino groups, preferably tertiary amino-lower-alkylamino groups, such as di-lower-alkylamino-lower-alkylamino groups, for example, the β-dimethylamino- or β-diethylamino-ethyl- or propyl-amino group, or an alkyl-eneamino-lower alkylamino group the alkylene radical of which may also be interrupted by hetero atoms, such as oxygen, nitrogen or sulphur, such as a pyrrolidino, piperidino, piperazino or morpholino group.

The new compounds of this invention possess a sedative action and are useful as medicaments, for example, for producing a tranquilising effect, or as intermediate products for the preparation of medicaments.

Especially valuable is 4-(para-aminophenylmercapto)-pyridine of the formula

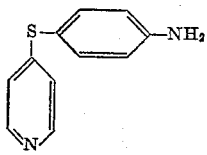

and also 4-(para-amino-ortho-chloro-phenylmercapto)-pyridine and salts of these compounds.

The new compounds are made by methods in themselves known. Thus, a compound of the formula

and a compound of the formula Y—Ph—Z, in which Formulae X and Y represent reactive substituents capable of splitting off during the reaction to link together the two cyclic residues by a sulphide linkage —S—, and Z represents R or a substituent convertible into R, are reacted together, and, when the resulting compound contains a substituent convertible into R, the said substituent is so converted, and/or in a compound with a free amino group the latter is substituted in a manner known per se, e.g. is converted into an amino-lower alkylamino group.

In these compounds one of the residues X and Y advantageously represents a free mercapto group, if desired, in the form of a metal salt, such as an alkali metal or alkaline earth metal salt, and the other represents an exchangeable substituent, such as an activated halogen atom, especially chlorine or bromine. A substituent Z convertible into R is, for example, a substituent convertible into an amino group by reduction or hydrolysis, such as a nitro, acylamino or azo group. As acylamino groups there may be mentioned more especially lower alkanoyl amino groups, such as the acetylamino group, or carbalkoxy amino groups, such as the carbethoxy amino group.

Thus, for example, 4-mercapto pyridine, advantageously in the form of a metal salt thereof, such as an alkali metal salt, or in the presence of a condensing agent capable of forming such salt, is reacted with an appropriate halogen-phenyl compound of which the halogen atom is activated by an ortho or para-nitro group, such as an appropriate nitro-halogen benzene, for example, para-nitro-chlorobenzene or para-nitro-bromobenzene, and the nitro group in the resulting compound is subsequently reduced in known manner, for example, by catalytically activated or nascent hydrogen, to the amino group. Alternatively, a 4-halogen-pyridine, such as 4-chloro- or 4-bromo-pyridine, may be reacted with a mercapto benzene, which contains an amino group or a substituent convertible into an amino group, and which is advantageously in the form of a metal, such as alkali metal, salt thereof, or is reacted in the presence of a condensing agent capable of forming such salt, and, when the resulting compound contains a substituent convertible into an amino group, the said substituent is converted into the amino group. Preferable reaction components, are, for example para-nitro- and para-acetylamino-thiophenol, of which the nitro and acetylamino groups, respectively, are subsequently converted in known manner into the free amino group. In those compounds which contain a free amino group substituents may be introduced into the group in the usual manner, for example, by acylation or amino-alkylation. Thus, a free amino group may be acylated, for example, by reaction with an aryl sulphonic acid halide, such as para-toluene sulphochloride, advantageously in the presence of a condensing agent such as a base, for example, pyridine, then reacted with an aminoalkyl halide, for example, diethylaminoethyl chloride, in the presence of a condensing agent, such as an alkali metal hydride or amide, and then the aryl-sulphonyl residue is split off by hydrolysis from the resulting N-aryl-sulphonyl-N-amino-lower-alkyl compound.

The reactions in the process of this invention are carried out in the usual manner in the presence or absence of a diluent and/or condensing agent or catalyst, if desired, at a raised temperature, under atmospheric or superatmospheric pressure.

Depending on the procedure used the new compounds are obtained as the free bases or salts thereof. From the salts the free bases may be obtained in the usual manner, and the free bases may be converted into salts thereof in known manner. As salts there may be mentioned more especially therapeutically useful acid addition salts, such as those of hydrohalic acids, e.g. hydrochloric acid, sulphuric acid, nitric acid, phosphoric acid, perchloric acid, acetic acid, propionic acid, oxalic acid, malic acid, citric acid, tartaric acid, methane sulphonic acid, oxyethane sulphonic acid, amino-carboxylic acids, salicylic acid, benzoic acid, or benzene sulphonic acids such as toluene sulphonic acid, or salts useful for the isolation of the free bases.

The starting materials are known or can be made by methods in themselves known. There are advantageously used starting materials which lead to the formation of end products mentioned above as being especially advantageous.

The invention also includes any modification of the process in which there is used as starting material a compound obtainable as an intermediate product at any stage of the process, and the remaining steps of the process are carried out or the process is interrupted at any stage.

The new compounds or their salts are useful as medicaments, in the form of pharmaceutical preparations which contain the active compound or a salt thereof in admixture with a pharmaceutical organic or inorganic, solid or liquid carrier suitable for enteral, parenteral or topical administration. For making the carriers there are used substances which do not react with the new compounds, for example, water, gelatine, lactose, starches, magnesium stearate, talc, vegetable oils, benzyl alcohols, gums, polyalkylene glycols or other known carrier for medicaments. The pharmaceutical preparations may be in the form for example, of tablets, dragees, or in liquid form as solutions, suspensions or emulsions. If desired they may be sterilised or may contain auxiliary substances, such as preserving, stabilising, wetting or emulsifying agents, salts for regulating the osmotic pressure or buffers. They may contain other therapeuticaly valuable substances. The preparations are made up by the usual methods.

The following examples illustrate the invention:

Example 1

11.1 grams of 4-mercapto pyridine are added to a solution of 2.3 grams of sodium in 50 cc. of absolute ethanol, and then a solution of 20.2 grams of para-nitro-bromobenzene in 60 cc. of dioxane is added dropwise in the course of 1 hour at 70–80° C., while stirring. After boiling the mixture under reflux overnight, it is evaporated in vacuo, the residue is dissolved in 5N-hydrochloric acid, and extracted with ether in order to remove the excess of 4-nitro-bromobenzene. The aqueous phase is filtered with charcoal, the filtrate is rendered alkaline with potassium carbonate while stirring, and the crystalline precipitate of 4-(para-nitro-phenylmercapto)-pyridine is filtered off with suction and recrystallised from methanol. It melts at 81–82° C.

14.1 grams of 4-(para-nitro-phenylmercapto)-pyridine are hydrogenated in 250 cc. of ethanol at room temperature under atmospheric pressure with 5 grams of Rupe nickel. 4.2 litres of hydrogen are absorbed. 4.08 litres are required by theory. After filtering off the catalyst, the filtrate is concentrated. 4-(para-amino-phenylmercapto)-pyridine of the formula

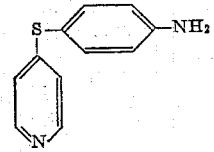

crystallises in yellow lamellae melting at 170.5–171.5° C.

Example 2

11.1 grams of 4-mercapto-pyridine and 19.3 grams of 4-nitro-1:2-dichlorobenzene in 50 cc. of dioxane are added to a solution of sodium ethylate prepared from 2.3 grams of sodium and 50 cc. of absolute ethanol, and the mixture is boiled under reflux for 23 hours, while stirring. After cooling the mixture, the 4-(para-nitro-ortho-chlorophenyl mercapto)-pyridine, which crystallises out, is filtered off with suction, washed with water and recrystallised from ethanol. It then melts at 133–135° C.

19 grams of 4-(para-nitro-ortho-chloro-phenyl mercapto)-pyridine are hydrogenated in 400 cc. of ethanol with 5 grams of Rupe nickel under atmospheric pressure. 4.7 litres of hydrogen are absorbed (4.78 litres being required by theory). The catalyst is filtered off, the filtrate is strongly concentrated, and diluted with a small amount of water. The resulting 4-(para-amino-ortho-chlorophenylmercapto)-pyridine of the formula

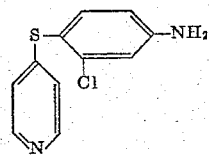

crystallises in yellowish dense prisms melting at 154–154.5° C.

Example 3

20.2 grams of 4-(para-amino-phenylmercapto)-pyridine are dissolved in 80 cc. of dioxane and 16 cc. of pyridine, and a solution of 21 grams of para-toluene sulphochloride in 40 cc. of dioxane is added. There is a spontaneous evolution of heat and the tosyl compound begins to crystallise out after a few minutes. After allowing the mixtures to stand overnight, it is poured into water, the crystallisate is filtered off with suction, washed with water, dried in vacuo, and recrystallised from methanol. The resulting 4-(para-toluene sulphonyl-amino-phenylmercapto)-pyridine crystallises in yellow prisms at 199–200° C.

10.68 grams of 4-(para-toluenesulphonyl-amino-phenyl-mercapto)-pyridine in 100 cc. of absolute dioxane are heated with 1.46 grams of sodamide for 4 hours at 90–100° C. while stirring. 5 grams of β-chloroethyl-diethylamine are added dropwise to the resulting sodium salt at 80° C. in the course of ½ hour, and the mixture is stirred for a further 5 hours at 80° C. After filtering off the sodium chloride, the filtrate is evaporated in vacuo, the residue is treated with 200 cc. of acetic acid of 10% strength, the solution is filtered with charcoal, the filtrate is rendered basic with potassium carbonate, and the base is extracted in the usual manner with ether. In order to remove the tosyl group the resulting oil is heated with 100 grams of sulphuric acid of 75% strength for 4 hours at 125–130° C. The mixture is poured on to ice, then rendered alkaline with a 10N-solution of caustic soda while adding ice, and the precipitated oil is extracted with ether. After distilling off the ether, a brown oil remains behind which is purified by distillation in a bulb tube. The resulting 4-[para-(β-diethylamino-ethylamino)-phenylmercapto]-pyridine of the formula

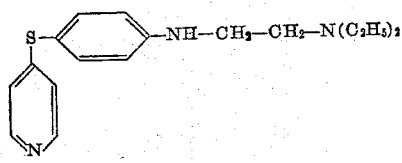

passes over under a pressure of 0.05 mm. of mercury and at an air bath temperature of 175–185° C. in the form of a slightly yellowish oil. Its dihydrochloride, which is prepared in the usual manner with two equivalents of hydrochloric acid, forms yellowish crystals melting at 193–195° C.

Example 4

11.1 grams of 4-mercapto-pyridine are boiled for 5 hours under reflux with a solution of 2.3 grams of sodium in 60 cc. of ethanol with 20 grams of 2-chloronitrobenzene. The ethanol is then distilled off, the excess 2-chloro-nitrobenzene expelled with steam, the residue dissolved in 25 cc. of 5N-hydrochloric acid, the solution filtered with charcoal and the filtrate rendered alkaline with 5N-sodium hydroxide solution. 4-(ortho-nitro-phenyl-mercapto)-pyridine precipitates in crystalline form and melts at 120–122° C.

15 grams of 4-(ortho-nitro-phenyl-mercapto)-pyridine are hydrogenated in 300 cc. of ethanol with 4 grams of Rupe-nickel until the absorption of hydrogen ceases. The resulting 4-(ortho-amino-phenylmercapto)-pyridine of the formula

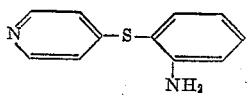

crystallizes from a mixture of acetone and ether in the form of colourless prisms melting at 110–111° C.

Example 5

11.1 grams of 4-mercaptopyridine are boiled under reflux for 12 hours in a solution of 2.3 grams of sodium in 80 cc. of absolute ethanol with 25 grams of 4-chloro-3-nitro-anisol. The ethanol is then distilled off, 300 cc. of 5N-hydrochloric acid are added to the residue, and the excess chloro-nitro-anisol removed by extraction with ethyl acetate. The hydrochloric acid solution is rendered alkaline with 10N-sodium hydroxide solution while cooling with ice, and the base which precipitates extracted with methylene chloride. The so-obtained 4-(ortho-nitro-para-methoxy-phenyl-mercapto)-pyridine is purified by distillation in high vacuum. It boils at 170–171° C. under 0.1 mm. of pressure and melts at 61–63° C.

17 grams of this nitro-compound are hydrogenated with 5 grams of Rupe-nickel in 150 cc. of ethanol. There is obtained 4-(ortho-amino-para-methoxy-phenylmercapto)-pyridine of the formula

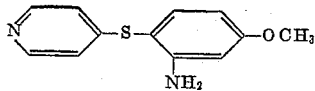

It crystallizes from a mixture of acetone and ether in the form of colourless prisms melting at 96–97° C.

Example 6

14.7 grams of the dry sodium salt of ortho-amino-thiophenol are heated for 12 hours at 140–150° C. in 150 cc. of absolute dioxane with 11.3 grams of 4-chloropyridine and 10 cc. of dimethyl formamide in a closed tube. The mixture is then evaporated in vacuo, the residue taken up in chloroform, the chloroform solution washed with 2N-sodium hydroxide solution and then with water, dried with sodium sulphate and evaporated. The crystalline residue is recrystallized from acetone. There is obtained 4-(ortho-amino-phenyl-mercapto)-pyridine in the form of faintly yellowish prisms melting at 110–111° C. which are identical with the product described in Example 4.

What is claimed is:

1. 4-(ortho-amino-para - methoxy - phenylmercapto)-pyridine.
2. 4-(para-amino-ortho-chloro-phenylmercapto) - pyridine.
3. 4-[para-(diethylamino - ethylamino) - phenylmercapto]-pyridine.
4. 4-(para-toluene-sulphonyl - amino - phenylmercapto)-pyridine.
5. A member of the group consisting of a compound of the formula

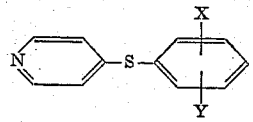

in which X stands for primary amino, and Y represents a member of the group consisting of halogeno, lower alkoxy and amino, and its therapeutically useful acid addition salts.

6. 4-[para-(di-lower alkyl amino-lower alkylamino)-phenylmercapto]-pyridine.

References Cited in the file of this patent

Backer et al.: Chem. Abst., vol. 40, column 3414 (1946).

Takahashi et al.: Chem. Abstracts. vol. 50, column 336 (1956).